United States Patent [19]

Gardziella et al.

[11] Patent Number: 4,587,291

[45] Date of Patent: May 6, 1986

[54] MULTICOMPONENT AQUEOUS RESOLE BINDER WITH EXTENDED PROCESSABILITY TIME

[75] Inventors: Arno Gardziella, Witten; Karl-Heinz Schwieger, Iserlohn; Peter Adolphs, Iserlohn; Gerhard Grossmann, Iserlohn, all of Fed. Rep. of Germany

[73] Assignee: Rütgerswerke Aktiengesellschaft, Frankfurt, Fed. Rep. of Germany

[21] Appl. No.: 727,038

[22] Filed: Apr. 25, 1985

Related U.S. Application Data

[62] Division of Ser. No. 652,681, Sep. 20, 1984, abandoned.

[30] Foreign Application Priority Data

Oct. 4, 1983 [DE] Fed. Rep. of Germany ....... 3335933

[51] Int. Cl.⁴ .......................... C08G 8/28; C08G 8/30; C08G 8/34
[52] U.S. Cl. .................................... 524/595; 428/430; 428/436; 428/524; 524/596; 525/504; 525/505; 525/506; 525/442; 528/139; 528/140; 528/143; 528/158
[58] Field of Search ....................... 525/504, 505, 506; 528/139, 140, 143, 158; 524/595, 596; 428/430, 436, 524, 525–542

[56] References Cited

U.S. PATENT DOCUMENTS

| | | |
|---|---|---|
| 3,567,689 | 5/1971 | Economy et al. |
| 4,075,178 | 2/1978 | Turner |
| 4,125,410 | 11/1978 | Natsuume |
| 4,252,938 | 2/1981 | Valgin et al. |
| 4,299,938 | 11/1981 | Green et al. |
| 4,336,363 | 6/1982 | Crivello |
| 4,383,098 | 5/1983 | Menting |
| 4,398,014 | 8/1983 | Green et al. |
| 4,448,951 | 5/1984 | Rupert et al. |

*Primary Examiner*—Howard E. Schain
*Attorney, Agent, or Firm*—Beveridge, DeGrandi & Weilacher

[57] ABSTRACT

Binders are described based on acid curing phenol resins and acid curing agents which, after mixing, have an extended processability time but nevertheless exhibit a rapid curing time at relatively low temperatures. They are obtained by using, as the resin, aqueous phenol resols and, as the curing agent, either copper, aluminum, or iron(III) salts of aromatic sulfonic acids or addition products of hydroxy-containing, water-compatible polyols with aromatic sulfonic acids or mixtures of these salts and the polyol addition products. The binders are used for impregnation of fabrics, for production of abrasives and for fiber reinforced plastics.

14 Claims, No Drawings

MULTICOMPONENT AQUEOUS RESOLE BINDER WITH EXTENDED PROCESSABILITY TIME

This is a division of application Ser. No. 652,681, filed Sept. 20, 1984, now abandoned.

The invention relates to binders based on acid curing, aqueous phenol resins and acid curing agents which, after mixing, exhibit an extended processability time, but nevertheless exhibit a rapid curing time at relatively low temperature.

For different applications, such as for example, for the production of phenol resin bonded shapes, for fiber reinforced phenol resin products, or for coated abrasives, resin/curing agent systems are required which, if possible, have a storage stability of several hours at room temperature; i.e., which are still processable, or have good processability, after several hours, but which gel within a few minutes at only moderately elevated temperature and for which, depending on the use, the processability time and gelling time can be varied within certain limits.

In previous systems, relatively low processability times (in the case of multicomponent systems) have either been accepted or the curing has been carried out at relatively high temperatures of 120°–140° C.

Since both of these solutions are technically unsatisfactory, a requirement existed for binders based on phenol resins, which satisfy the above-mentioned conditions and which, in addition, have good mechanical properties. This task is solved by the provision of binders according to the present invention which are based on acid curing phenol resins and acid curing agents, which are used in a ratio of resin to curing agent of 1:0.05 to 1:0.5. These binders contain, as the resin, aqueous phenol resols with a mole ratio of the amounts of phenol and aldehyde used of 1:1.1 to 1:3.0 and, as a curing agent, either copper, aluminum, or iron(III) salts of aromatic sulfonic acids or addition products of hydroxy group containing, water compatible polyols with an OH number in the range of 50 to 500 with aromatic sulfonic acids, or mixtures of these salts and the above addition products.

According to a preferred aspect of the invention, the phenol resins exhibit a content of monomeric phenol of less than 5%, and are modified by reaction with urea, melamine, or furfuryl alcohol.

In a still further preferred aspect of the invention, the mixtures of salts of sulfonic acids and polyols are used in a weight ratio of 90:10 to 10:90.

The use of salts for the curing of phenol resols is known from J. Scheiber: "Chemie und Technologie der künstlichen Harze" [Chemistry and Technology of Synthetic Resins], Wiss. Verlagsgesellschaft (1943), page 503. This involves salts that show an acid reaction in aqueous solution as a result of hydrolysis, such as, for example, iron(III) chloride or aluminum chloride (Swiss Pat. No. 66,513) or alkali salts of sulfonic acids of the aralkyl chlorides (German Pat. No. 715,163). These salts even produce a very good cure in the cold. However, a variation of the processing time is not possible with these curing agents.

From Euorpean Patent Application 0 050 020, it is known to extend the processing time of acid curing phenol resins if substances that hydrolyze to strong acids in the mixture, such as, for example, aromatic sulfonyl chlorides, are used as curing agents.

A consideration of the values obtained shows that the increase in the processing time is approximately 40 minutes at 20° C. and a still acceptable curing time at 23° C. is possible, but the extension of the processing time achieved in this manner is still not satisfactory.

It has now been found, surprisingly, that aqueous phenol resols that are mixed with aqueous solutions of specific salts of aromatic sulfonic acids have a processability time of several hours at room temperature, but nevertheless gel and cure rapidly at an elevated temperature. An even more favorable curing behavior is shown by addition products of water compatible polyols having an OH number in the range of 50 to 50 with strong organic acids. However, this cure with acid polyol adducts leads to certain flexibility characteristics in the cured product which are not always desirable.

It has been found that the optimal curing behavior and the optimal mechanical properties of the cured resins are established by a combination of two types of curing agents; namely, a mixture of a copper, aluminum, or iron(III) salt of an aromatic sulfonic acid and acid polyol adducts in a relative ratio of 90:10 to 10:90, preferably in a ratio of 50:50.

The acid curing phenol resins; i.e. the phenol resoles, used according to the invention are alkaline condensed, reaction products of phenols and aldehydes, wherein both mono- or polynuclear phenols may be used, since both classes can form condensation products effective for purposes of the invention. In further detail, mononuclear phenols, and both mono- and polyfunctional phenols, such as phenol itself, and also its alkyl substituted homologs, such as o-, m-, p-cresol or xylenols, are suitable for this purpose. Also suitable are halogen substituted phenols, such as chloro- or bromophenol and polyfunctional phenols, such as resorcinol or pyrocatechol. The term "polynuclear phenols" refers, on the one hand, for example, to naphthols; i.e., compounds with fused rings. On the other hand, however, one can also use polynuclear phenols for the purposes of the invention that are linked by aliphatic bridges or by hetero atoms, such as oxygen. In addition, polyfunctional, polynuclear phenols also provide suitable products.

As the aldehyde component, one can use formaldehyde, acetaldehyde, propionaldehyde, or butyraldehyde, and also products that can release an aldehyde under condensation conditions, such as, for example, formaldehyde bisulfite, urotropin, trihydroxymethylene, paraformaldehyde, or paraldehyde. The stoichiometric quantities of phenol and aldehyde components are in the ratio of 1:1.1 to 1:3.0. The resins are usually used in the form of aqueous solutions with a content of non-volatile substances according to DIN 16916-02-H1 of 60 to 85%.

The phenol resins used according to the invention preferably have a content of monomeric phenols of less than 5%. They can also be modified additionally with up to 30% of urea, melamine or furfuryl alcohol, according to known methods.

Effective as salts of organic sulfonic acids for purposes of the invention are the copper, aluminum, and iron(III) salts of aromatic sulfonic acids represented by the structural formula:

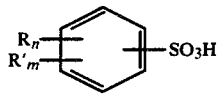

where R and R' can be identical or different and represent hydrogen, an alkyl, hydroxy, alkoxy, or carboxy group; a substituted or unsubstituted aryl or aralkyl group; or another, optionally substituted, sulfonyl group, and n and m can be identical or different and represent integral numbers from 0 to 5, but do not add to more than 5. The number of carbon atoms of the aromatic sulfonic acids is 6 to 14,, with 6 carbon atoms for benzene sulfonic acid and 14 for anthracene sulfonic acid. Alkyl groups of the substituted aromatic sulfonic acids are methyl, ethyl, propyl, isopropyl, dimethyl and trimethyl. As substituted sulfonyl, an methylene sulfonyl group or generally a sulfonated alkylene chain is meant. Examples of sulfonic acids of this type are benzenesulfonic acids, benzenedisulfonic acids; alkylbenzenesulfonic acids, such as toluenesulfonic, toluenedisulfonic, xylenesulfonic, trimethylbenzenesulfonic, isopropylbenzenesulfonic, or tetrahydronaphthalenesulfonic acid, sulfobenzoic acid, sulfophthalic acid; hydroxysulfonic acids, such as hydroxybenzenesulfonic, dihydroxybenzenesulfonic, hydroxybentenedisulfonic or cresolsulfonic acid, methoxybentene sulfonic, carbon-hydroxibentenesulfonic, diphenylmethanedisulfonic, diphenyl ether disulfonic, diphenyl sulfone disulfonic, naphthalenesulfonic, alkylnaphthalenesulfonic, naphthalenedisulfonic, anthracenesulfonic, or carbazolesulfonic acid. The preferred sulfonic acids are benzenesulfonic, phenolsulfonic, or p-toluenesulfonic acid. Salts of individual sulfonic acids or of sulfonic acid mixtures and mixtures of salts of different metals can be used.

The addition products of aromatic sulfonic acids to polyols, which are also used as curing agents, are obtained by mixing the aqueous solutions of the acids with the polyols or their aqueous solutions and subsequently heating of the mixtures (5–10 minutes to 50°–100° C.). They are used as aqueous solutions.

The mole ratio of acid to polyol can be within the range of 3:1 to 1:3. A mole ratio of 2:1 is preferably used. All of the sulfonic acids mentioned above, individually or mixed with each other, can be used as aromatic sulfonic acids for the addition products according to the invention. Benzenesulfonic, phenolsulfonic, and/or p-toluenesulfonic acid are used on a preferred basis.

Both water-soluble polyether and polyester polyols are suitable as polyols, insofar as they have an OH number in the range of 50–500. The polyols generally have a molecular weight in the range of 200 to 4000.

Examples of polyether polyols are the aliphatic series such as polyethylene glycols, polypropylene glycols, or reaction products of propylene oxide with different triol components, such as trimethylolpropane or glycerol or with penta- and hexafunctional alcohols.

Polyester polyols are condensation products of aliphatic and/or aromatic dicarboxylic acids such as, for example, the three isomeric phthalic acids or adipic, succinic, glutaric acid or the like with polyhydric alcohols such as, for example, butanediol, hexanetriol, glycerol, or trimethylolpropane. The polyols modified by the addition of unsaturated fatty acids can also be used with good results.

The quantity of the curing agents used is calculated such that the weight ratio of resin to curing agents or curing agent combination is in the range of 1:0.05 to 1:0.5. The mixtures thus produced have a processing time of over four hours at roomm temperature, i.e., during this time period the cure is so minimal that only a relatively small increase in viscosity is observed and processing can be carried out without disturbance of the polymer structure of the product cured later.

The curing is carried out in practice at a moderately elevated temperature, preferably within the range of 60°–80° C. In this case, the resin/curing agent mixture is tack-free within a few minutes and the cure takes place in such a way that it is complete after one to three hours.

The resin/curing mixtures according to the invention, on the basis of their properties and their curing behavior, are particularly suitable for the following applications: for the impregnation of fabrics and for the production of abrasives or of fiber-reinforced, particularly glass-fiber-reinforced plastics.

The invention is illustrated in greater detail by the following examples.

EXAMPLES

Phenol resol solutions are mixed with different curing agent solutions at room temperature.

With these mixtures of phenol and curing agent, the following tests are carried out in each case:

(a) Viscosity immediately after mixing of the components. The determination is carried out at 20° C. with a falling ball viscometer according to DIN 53015.

(b) Viscosity four hours after mixing of the components and storage of the mixture at 20° C. The determination is carried out at 20° C. with a falling ball viscometer according to DIN 53015.

(c) Gelling time at 100° C. according to DIN 16916-02-D.

(d) Gelling time at 130° C. according to DIN 16916-02-D.

(e) Rockwell hardness
  The determination of the Rockwell hardness is carried out after curing at 80° C. in a drying cabinet with a steel ball according to DIN 53456. In the tests according to the invention and the comparison tests with reactive mixtures, the curing time is 3.5 hours. For comparison tests with relatively unreactive mixtures, the measured Rockwell hardness is followed by the time required for this purpose.

(f) Coating on vulcanized fiber
  The resin or mixture of resin and curing agent is applied in a layer thickness of approximately 100 microns (wet film) on a cut-in-half circular vulcanized fiber blank 18 cm in diameter by means of a hand coating instrument (Hand-Coater K 8). After 20 seconds, the vulcanized fiber specimen prepared in this manner is cured in a drying cabinet preheated to 80° C.
  The time required to reach a tack free surface (non-adhesion of scattered sand) is determined. The cured specimen is also examined to determine the flow of the applied layer. In this case, the flow is assessed as follows:
  good: uniform flow, no fish-eyes, pits, or blisters.
  average: flow not completely uniform, small pits, small blisters.
  poor: non-uniform flow, fish-eyes, pits, blisters.

TEST RESULTS

The results obtained are presented in tabular form following the description of the curing agents used in the examples and comparison examples.

PHENOL RESIN USED

All examples and comparison examples (with the exception of comparison examples 2 and 3) are carried out with a commercial alkaline condensed, phenol formaldehyde condensation resin with a phenol-formaldehyde ratio of 1:1.8 and an average content of 3–4% of free phenol. This phenol resol is used as an aqueous solution with a content of non-volatile substances according to DIN 16916-02-H1 of approximately 79%.

CURING AGENTS USED

The sulfonates used are technical, commercial products, which can be obtained as aqueous solutions and are used unchanged. The addition products from sulfonic acids and polyols are obtained by mixing the appropriate quantities of polyol and aqueous sulfonic acid solution with each other and holding for 15 minutes at 50° C. The solutions obtained are used after cooling, without further change, in the amounts indicated.

In the individual examples, the nature and quantity of the curing agents and mixtures of curing agents are varied as follows. The amounts stated in parts by weight relate in each case to 100 parts by weight of phenol resol solution. All percentages are given in weight percent.

EXAMPLE 1

Curing agent: 10 parts by weight of a 50% aqueous solution of aluminum phenolsulfonate.

EXAMPLE 2

Curing agent: 15 parts by weight of a 50% aqueous solution of aluminum phenolsulfonate.

EXAMPLE 3

Curing agent: 20 parts by weight of a 50% aqueous solution of aluminum phenolsulfonate.

EXAMPLE 4

Curing agent: 15 parts by weight of a 60% aqueous solution of copper p-toluenesulfonate.

EXAMPLE 5

Curing agent: 15 parts by weight of a 46% aqueous solution of iron(III) p-toluenesulfonate.

EXAMPLE 6

Curing agent: 25 parts by weight of a 46% aqueous solution of iron(III)-p-toluenesulfonate.

EXAMPLE 7

Curing agent: 45 parts by weight of a 46% aqueous solution of iron(III) p-toluenesulfonate.

EXAMPLE 8

Curing agent: 15 parts by weight of an addition product from 67 parts by weight of 60% aqueous p-toluenesulfonic acid solution and 33 parts by weight of a polyester polyol with an OH number of 350.

EXAMPLE 9

Curing agent: 15 parts by weight of an addition product from 67 parts by weight of 60% aqueous p-toluenesulfonic acid solution and 33 parts by weight of a polyester polyol with an OH number of 110.

EXAMPLE 10

Curing agent: 20 parts by weight of a curing agent according to Example 9.

EXAMPLE 11

Curing agent: 15 parts by weight of an addition product from 67 parts by weight of 60% aqueous phenolsulfonic acid solution and 33 parts by weight of a polyester polyol with an OH number of 350.

EXAMPLE 12

Curing agent: 15 parts by weight of an addition product from 33 parts by weight of 60% aqueous phenolsulfonic acid solution and 67 parts by weight of a polyester polyol with an OH number of 350.

EXAMPLE 13

Curing agent: 15 parts by weight of an addition product from 67 parts by weight of 60% aqueous phenolsulfonic acid solution and 33 parts by weight of a polyester polyol with an OH number of 110.

EXAMPLE 14

Curing agent: 15 parts by weight of an addition product from 33 parts by weight of 60% aqueous phenolsulfonic acid solution and 67 parts by weight of a polyester polyol with an OH number of 110.

EXAMPLE 15

Curing agent: 15 parts by weight of addition product, prepared from 35 parts by weight of a polypropylene glycol with an average molecular weight of 2000 and an OH number of 56 and 65 parts by weight of 60% aqueous p-toluenesulfonic acid solution.

EXAMPLE 16

Curing agent: 15 parts by weight of an addition product, prepared from 65 parts by weight of 60% p-toluenesulfonic acid solution and 33 parts by weight of a polyethylene glycol with an average molecular weight of 400 and an OH number of 267.

EXAMPLE 17

Curing agent: 15 parts by weight of an addition product, prepared from 65 parts by weight of a 40% aqueous solution of naphthalenesulfonic acid (isomer mixture) and 35 parts by weight of a polyester polyol with an OH number of 350.

EXAMPLE 18

Curing agent: 15 parts by weight of a mixture of 50 parts by weight of a 50% aqueous solution of aluminum phenolsulfonate and 50 parts by weight of an addition product, prepared from 33 parts by weight of 60% xylenesulfonic acid solution (isomer mixture) and 67 parts by weight of a polypropylene glycol (molecular weight 2000, OH number 56).

EXAMPLE 19

Curing agent: 15 parts by weight of a mixture of 85 parts by weight of a 50% aqueous of aluminum phenolsulfonate in water and 15 parts by weight of an addition product from 33 parts by weight of 60% aqueous p-toluenesulfonic acid solution and 67 parts by weight of polyester polyol with OH number 350.

EXAMPLE 20

Curing agent: 15 parts by weight of a mixture of 15 parts by weight of a 50% solution of aluminum sulfonate in water and 85 parts by weight of an addition product from 33 parts by weight of 60% aqueous p-toluenesulfonic acid solution and 67 parts by weight of polyester polyol with an OH number of 350.

EXAMPLE 21

Curing agent: 15 parts by weight of a mixture of 50 parts by weight of a 50% solution of aluminum sulfonate in water and 50 parts by weight of an addition product from 50 parts by weight of 60% aqueous p-toluenesulfonic acid solution and 50 parts by weight of polyester polyol with OH number 350.

EXAMPLE 22

Curing agent: 15 parts by weight of an addition product from 67 parts by weight of 50% aqueous benzenesulfonic acid solution and 33 parts by weight of a polyester polyol with an OH nummber of 110.

COMPARISON EXAMPLE 1

No curing agent.

COMPARISON EXAMPLE 2

No curing agent; the resin used is a reactive phenol resol based on phenol formaldehyde in a ratio of 1:1.7 with a free phenol content of 7.5%, a gelling time at 100° C. of 30 minutes, and a content of 75% of non-volatile substances.

COMPARISON EXAMPLE 3

No curing agent; the resin used is a mixture of a reactive phenol resol (corresponding to Comparison Example 2) and a reactive phenol resorcinol resol in a ratio of 1:1. The phenol resorcinol resol has a ratio of phenol and resorcinol to formaldehyd of 1:1.5 and a content of 75% of non-volatile substances.

COMPARISON EXAMPLE 4

Curing agent: 3 parts by weight of benzenesulfonyl chloride.

COMPARISON EXAMPLE 5

Curing agent: 3 parts by weight of p-toluenesulfonic acid.

COMPARISON EXAMPLE 6

Curing agent: 15 parts by weight of p-toluenesulfonic acid.

COMPARISON EXAMPLE 7

Curing agent: 15 parts by weight of potassium p-toluenesulfonate (42% in water).

COMPARISON EXAMPLE 8

Curing agent: 15 parts by weight of an addition product from 67 parts by weight of chloroacetic acid and 33 parts by weight of a polyester polyol with OH number 350.

Further variations and modifications of the invention will be apparent to those skilled in the art from the foregoing description and are intended to be indicated by the claims appended hereto.

The German application P 33 35 933.4 of Oct. 4, 1983 is relied on and incorporated by reference.

| | a Viscosity immediate (mPa s) | b Viscosity after 4 hrs (mPa s) | c Gelling 100° (min;sec) | d Gelling 130° C. (min;sec) | e Rockwell hardness | f Coating Tack-free (min) | Flow |
|---|---|---|---|---|---|---|---|
| Example No. | | | | | | | |
| 1 | 400 | 600 | 22'40" | 6'40" | 967 after 7 hrs | 13 | good |
| 2 | 430 | 500 | 14'40" | 5'30" | 970 | 8 | good |
| 3 | 430 | 1580 | 5'30" | 3'30" | 973 | 7 | good |
| 4 | 270 | 350 | 13'20" | 5'40" | 890 | 8 | average |
| 5 | 230 | 620 | 12'30" | 5'30" | 960 | 10 | average |
| 6 | 250 | 2500 | 5'35" | 1'30" | 960 | 9 | average |
| 7 | 310 | >4000 | 2'10" | 1'10" | 962 | 8 | average |
| 8 | 400 | >4000 | 5'30" | 3'00" | 977 | 8 | average |
| 9 | 540 | 1600 | 7'00" | 3'10" | 965 | 8 | average |
| 10 | 500 | 3800 | 3'30" | 1'40" | 970 | 8 | average |
| 11 | 240 | >4000 | 2'30" | 1'10" | 927 | 8 | average |
| 12 | 350 | 410 | 124'20" | 18'10" | 958 after 17 hrs | 122 | average |
| 13 | 370 | >4000 | 2'30" | 1'20" | 971 | 8 | average |
| 14 | 400 | 450 | 139'10" | 19'32" | 970 after 17 hrs | 125 | average |
| 15 | 380 | 3500 | 5'50" | 2'00" | 966 | 8 | average |
| 16 | 390 | 3200 | 5'10" | 1'50" | 967 | 8 | average |
| 17 | 400 | >4000 | 5'20" | 2'30" | 970 | 8 | average |
| 18 | 400 | 800 | 12'40" | 4'00" | 970 | 8 | average |
| 19 | 380 | 410 | 13'50" | 5'20" | 957 | 8 | good |
| 20 | 520 | 1600 | 9'20" | 3'50" | 970 | 8 | average |
| 21 | 420 | 710 | 13'20" | 4'40" | 974 | 8 | good |
| 22 | 530 | 2100 | 6'00" | 2'50" | 966 | 7 | average |
| Comparison Example No. | | | | | | | |
| 1 | 270 | 275 | 52'30" | 17'15" | 970 after 20 hrs | 120 | good |
| 2 | 3000 | 3000 | 30' | 7' | 972 after 12 hrs | 60 | good |

-continued

| | a Viscosity immediate (mPa s) | b Viscosity after 4 hrs (mPa s) | c Gelling 100° (min;sec) | d Gelling 130° C. (min;sec) | e Rockwell hardness | f Coating Tack-free (min) | Flow |
|---|---|---|---|---|---|---|---|
| 3 | 3000 | 3000 | 16' | 5' | 970 after 9 hrs | 20 | average |
| 4 | 320 | 4000 | 3'40" | 1'10" | 966 | 8 | poor |
| 5 | 520 | 600 | 27'30" | 6'45" | 960 after 14 hrs | 25 | poor |
| 6 | 500 after 15 mins. | solid | 45" | 20" | 975 | 3 | poor |
| 7 | 350 | 365 | 150' | 45' | 965 after 20 hrs | 140 | average |
| 8 | 500 | 540 | 97'55" | 15'20" | 945 after 18 hrs | 76 | average |
| 9 | | | | | | | |

We claim:

1. A binder composition comprising in aqueous solution an acid curing phenol resin component and at least one acid curing agent therefore, wherein the resin is an aqueous phenol resol with a mole ratio of the phenol to aldehyde of 1:1.1 to 1:3.0 and a content of monomeric phenol of less than 5% and, wherein the curing agent is an addition product of a hydroxy group containing, water compatible polyol having an OH number in the range of 50 to 500 with an aromatic sulfonic acid.

2. The binder composition according to claim 1, further comprising that the phenol resin is modified with urea, melamine, or furfuryl alcohol.

3. The binder composition according to claim 1, wherein said aromatic sulfonic acid is represented by formula: wherein R and R' are the same or different and represent hydrogen, alkyl, hydroxy, alkoxy, carboxy, substituted or unsubstituted aryl or aralkyl, or sulfonyl or substituted sulfonyl, n and m are the same or different integers from 0 to 5 and n+m is no more than 5.

4. The binder composition according to claim 3, wherein the number of carbon atoms of the aromatic sulfonic acid is 6 to 14.

5. The binder composition according to claim 3, wherein the alkyl groups are methyl, ethyl, propyl, isopropyl, dimethyl and trimethyl.

6. The binder composition according to claim 3, wherein the acid is benzenesulfonic acid, phenolsulfonic acid or p-toluenesulfonic acid.

7. The binder composition according to claim 1, wherein the polyol is a polyester polyol.

8. The binder composition according to claim 7, wherein the polyester polyol is condensation product of an aliphatic or aromatic dicarboxylic acid and a polyhydric alcohol.

9. The binder composition according to claim 1, wherein said polyol has a molecular weight in the range of 200 to 4000.

10. The binder composition according to claim 1, further comprising at least one copper, aluminum, or iron (III) salt of an aromatic sulfonic acid.

11. The binder composition according to claim 10, further comprising that the mixtures of a salt of an aromatic sulfonic acid and polyol addition adduct is used in a weight ratio of 90:10 to 10:90.

12. A fabric impregnated with the binder composition of claim 1.

13. The binder composition according to claim 1 wherein the ratio of said resin to said addition product is 1:0.05 to 1:0.5.

14. The binder composition according to claim 1 wherein the addition product is prepared by heating a mixture of said water compatible polyol and said aromatic sulphonic acid for five to ten minutes to a temperature of 50°–100° C.

* * * * *